United States Patent
Mei (10) Patent No.: US 10,185,536 B2
(45) Date of Patent: Jan. 22, 2019

(54) COMMUNICATION METHOD AND TERMINAL

(71) Applicant: Huawei Device (Dongguan) Co., Ltd., Dongguan (CN)

(72) Inventor: Jingqing Mei, Beijing (CN)

(73) Assignee: Huawei Device (Dongguan) Co., Ltd., Dongguan (CN)

( * ) Notice: Subject to any disclaimer, the term of this patent is extended or adjusted under 35 U.S.C. 154(b) by 11 days.

(21) Appl. No.: 15/120,439

(22) PCT Filed: Feb. 2, 2015

(86) PCT No.: PCT/CN2015/072111
§ 371 (c)(1),
(2) Date: Aug. 19, 2016

(87) PCT Pub. No.: WO2015/124059
PCT Pub. Date: Aug. 27, 2015

(65) Prior Publication Data
US 2017/0075647 A1    Mar. 16, 2017

(30) Foreign Application Priority Data
Feb. 20, 2014 (CN) .......................... 2014 1 0057359

(51) Int. Cl.
*G06F 3/16* (2006.01)
*H04W 76/25* (2018.01)
*H04W 76/15* (2018.01)
*H04W 4/80* (2018.01)
*H04L 29/06* (2006.01)
*H04W 4/02* (2018.01)
*H04W 4/021* (2018.01)

(52) U.S. Cl.
CPC .......... *G06F 3/165* (2013.01); *H04L 65/1083* (2013.01); *H04L 65/80* (2013.01);
(Continued)

(58) Field of Classification Search
CPC .......... H04M 1/72533; H04R 2430/01; H04R 2227/005
(Continued)

(56) References Cited

U.S. PATENT DOCUMENTS 5,987,106 A * 11/1999 Kitamura ............ H04L 12/2803
379/102.02
8,285,545 B2  10/2012 Lee et al.
(Continued)

FOREIGN PATENT DOCUMENTS

CN  102164328 A   8/2011
CN  102714667 A   10/2012
(Continued)

*Primary Examiner* — Alexander Jamal (57) ABSTRACT

A method includes: when a first terminal determines to start to execute a voice service, sending a first message to a third terminal, where the first message is used to trigger the third terminal to determine that a location relationship between a second terminal and the first terminal meets a preset condition, and when the second terminal is playing audio by using a loudspeaker, sending a second message to the second terminal, where the second message is used to control the second terminal to adjust a playing mode; and when the first terminal determines to stop executing the voice service, sending a third message to the third terminal, where the third message is used to trigger the third terminal to send a fourth message to the second terminal, and the fourth message is used to control the second terminal to restore the playing mode before the adjustment.

20 Claims, 4 Drawing Sheets

(52) U.S. Cl.
CPC .......... *H04W 4/021* (2013.01); *H04W 4/023* (2013.01); *H04W 4/80* (2018.02); *H04W 76/15* (2018.02); *H04W 76/25* (2018.02)

(58) Field of Classification Search
USPC ....... 381/105; 455/72, 355; 379/395, 390.01
See application file for complete search history.

(56) References Cited

U.S. PATENT DOCUMENTS

| | | |
|---|---|---|
| 2003/0109246 A1 | 6/2003 | Shimizu et al. |
| 2003/0147517 A1 | 8/2003 | Peng |
| 2010/0112945 A1 | 5/2010 | Hanif |
| 2011/0177802 A1 | 7/2011 | Gupta |
| 2015/0079952 A1 | 3/2015 | Tsukada |

FOREIGN PATENT DOCUMENTS

| | | |
|---|---|---|
| CN | 102750258 A | 10/2012 |
| CN | 102761721 A | 10/2012 |
| CN | 103414992 A | 11/2013 |
| EP | 2051472 A1 | 4/2009 |
| JP | 2005004916 A | 1/2005 |
| JP | 2005341245 A | 12/2005 |
| JP | 2010114609 A | 5/2010 |
| JP | 2012080191 A | 4/2012 |
| JP | 2013197812 A | 9/2013 |
| KR | 20120045466 A | 5/2012 |
| KR | 20120120313 A | 11/2012 |

\* cited by examiner

COMMUNICATION METHOD AND TERMINAL

CROSS-REFERENCE TO RELATED APPLICATIONS

This application is a National Stage of International Application No. PCT/CN2015/072111, filed on Feb. 2, 2015, which claims priority to Chinese Patent Application No. 201410057359.2, filed on Feb. 20, 2014, both of which are hereby incorporated by reference in their entireties.

TECHNICAL FIELD

The present invention relates to the field of communications technologies, and in particular, to a communication method and a terminal.

BACKGROUND

With development of the information industry, multimedia services are increasingly widespread, and as an important part of the multimedia services, voice services become increasingly important. Meanwhile, how to reduce noise interference in voice services also becomes increasingly important.

In daily life, when a device is playing audio by using a loudspeaker, if at this time a terminal executes a voice service (for example, a voice call service), in this case, a voice played by the device interferes with execution of the voice service by the terminal.

SUMMARY

Embodiments of the present invention provide a communication method and a terminal, to implement that when a terminal executes a voice service, interference caused by a nearby device that is playing audio by using a loudspeaker is avoided.

According to a first aspect, a communication method is provided, which is applied to a first terminal, where the first terminal maintains a communication connection with a third terminal, the third terminal further maintains a communication connection with at least one second terminal, and the method includes:

when the first terminal determines to start to execute a voice service, sending a first message to the third terminal, where the first message is used to trigger the third terminal to determine that a location relationship between the second terminal and the first terminal meets a preset condition; and when the second terminal is playing audio by using a loudspeaker, sending a second message to the second terminal, where the second message is used to trigger the second terminal to adjust a playing mode; and when the first terminal determines to stop executing the voice service, sending a third message to the third terminal, where the third message is used to trigger the third terminal to send a fourth message to the second terminal, and the fourth message is used to trigger the second terminal to restore the playing mode before the adjustment.

With reference to the first aspect, in a first possible implementation manner of the first aspect, the adjusting a playing mode includes: pausing playing of the audio, turning off the loudspeaker, or turning down output volume of the loudspeaker; and correspondingly, the restoring the playing mode before the adjustment includes: continuing playing the audio, turning on the loudspeaker, or restoring the output volume of the loudspeaker to a value before the adjustment.

With reference to the first aspect or the first possible implementation manner of the first aspect, in a second possible implementation manner of the first aspect, the method further includes:

periodically acquiring, by the first terminal, location information, and sending the acquired location information to the third terminal.

With reference to the first aspect or either implementation manner of the two foregoing possible implementation manners of the first aspect, in a third possible implementation manner of the first aspect, the first message includes an identifier of the first terminal and an identifier indicating that the first terminal executes the voice service; or the first message includes an identifier of the first terminal, an identifier indicating that the first terminal executes the voice service, and the location information of the first terminal.

According to a second aspect, a communication method is provided, which is applied to a third terminal, where the third terminal maintains a communication connection with at least one first terminal, the third terminal maintains a communication connection with at least one second terminal, and the method includes:

receiving, by the third terminal, a first message sent when the first terminal determines to start to execute a voice service;

determining, by the third terminal, that a location relationship between the second terminal and the first terminal meets a preset condition, and when the second terminal is playing audio by using a loudspeaker, sending a second message to the second terminal, where the second message is used to trigger the second terminal to adjust a playing mode;

receiving, by the third terminal, a third message sent when the first terminal determines to stop executing the voice service; and sending, by the third terminal, a fourth message to the second terminal, where the fourth message is used to trigger the second terminal to restore the playing mode before the adjustment.

With reference to the second aspect, in a first possible implementation manner of the second aspect, the adjusting a playing mode includes: pausing playing of the audio, turning off the loudspeaker, or turning down output volume of the loudspeaker; and correspondingly, the restoring the playing mode before the adjustment includes: continuing playing the audio, turning on the loudspeaker, or restoring the output volume of the loudspeaker to a value before the adjustment.

With reference to the second aspect or the first possible implementation manner of the second aspect, in a second possible implementation manner of the second aspect, the method further includes:

receiving, by the third terminal, location information sent by the second terminal, and updating previously saved location information sent by the second terminal; and/or receiving, by the third terminal, the location information sent by the second terminal, and updating the previously saved location information sent by the second terminal.

With reference to the second aspect or either implementation manner of the two foregoing possible implementation manners of the second aspect, in a third possible implementation manner of the second aspect, the first message includes an identifier of the first terminal and an identifier indicating that the first terminal executes the voice service; or the first message includes an identifier of the first terminal, an identifier indicating that the first terminal executes the voice service, and the location information of the first terminal.

According to a third aspect, a terminal is provided, where the terminal maintains a communication connection with a third terminal, the third terminal further maintains a communication connection with at least one second terminal, and the terminal includes:

a determining unit, configured to determine whether the terminal executes a voice service;

a first sending unit, configured to: when the determining unit determines that the terminal starts to execute the voice service, send a first message to the third terminal, where the first message is used to trigger the third terminal to determine that a location relationship between the second terminal and the terminal meets a preset condition; and when the second terminal is playing audio by using a loudspeaker, send a second message to the second terminal, where the second message is used to trigger the second terminal to adjust a playing mode; and a second sending unit, configured to: when the determining unit determines that the terminal stops executing the voice service, send a third message to the third terminal, where the third message is used to trigger the third terminal to send a fourth message to the second terminal, and the fourth message is used to trigger the second terminal to restore the playing mode before the adjustment.

With reference to the third aspect, in a first possible implementation manner of the third aspect, the adjusting a playing mode includes: pausing playing of the audio, turning off the loudspeaker, or turning down output volume of the loudspeaker; and correspondingly, the restoring the playing mode before the adjustment includes: continuing playing the audio, turning on the loudspeaker, or restoring the output volume of the loudspeaker to a value before the adjustment.

With reference to the third aspect or the first possible implementation manner of the third aspect, in a second possible implementation manner of the third aspect, the terminal further includes: an acquiring unit, configured to periodically acquire location information; and a third sending unit, configured to send the location information acquired by the acquiring unit to the third terminal.

With reference to the third aspect or either implementation manner of the two foregoing possible implementation manners of the third aspect, in a third possible implementation manner of the third aspect, a first message sent by the first sending unit includes an identifier of the terminal and an identifier indicating that the terminal executes the voice service; or a first message sent by the first sending unit includes an identifier of the terminal, an identifier indicating that the terminal executes the voice service, and the location information of the terminal.

According to a fourth aspect, a terminal is provided, where the terminal maintains a communication connection with at least one first terminal, the terminal maintains a communication connection with at least one second terminal, and the terminal includes:

a first receiving unit, configured to receive a first message sent when the first terminal determines to start to execute a voice service;

a determining unit, configured to determine whether a location relationship between the second terminal and the first terminal meets a preset condition when or after the first receiving unit receives the first message, and whether the second terminal is playing audio by using a loudspeaker;

a first sending unit, configured to: when the determining unit determines that the location relationship between the second terminal and the first terminal meets the preset condition, and the second terminal is playing the audio by using the loudspeaker, send a second message to the second terminal, where the second message is used to trigger the second terminal to adjust a playing mode;

a second receiving unit, configured to receive a third message sent when the first terminal determines to stop executing the voice service; and a second sending unit, configured to send a fourth message to the second terminal, where the fourth message is used to trigger the second terminal to restore the playing mode before the adjustment.

With reference to the fourth aspect, in a first possible implementation manner of the fourth aspect, the adjusting a playing mode includes: pausing playing of the audio, turning off the loudspeaker, or turning down output volume of the loudspeaker; and correspondingly, the restoring the playing mode before the adjustment includes: continuing playing the audio, turning on the loudspeaker, or restoring the output volume of the loudspeaker to a value before the adjustment.

With reference to the fourth aspect or the first possible implementation manner of the fourth aspect, in a second possible implementation manner of the fourth aspect, the terminal further includes at least one of the following:

a first processing unit, configured to receive location information sent by the first terminal, and update previously saved location information sent by the first terminal; and a second processing unit, configured to receive location information sent by the second terminal, and update previously saved location information sent by the second terminal.

With reference to the fourth aspect or either implementation manner of the two foregoing possible implementation manners of the fourth aspect, in a third possible implementation manner of the fourth aspect, a first message received by the first receiving unit includes an identifier of the first terminal and an identifier indicating that the first terminal executes the voice service; or a first message received by the first receiving unit includes an identifier of the first terminal, an identifier indicating that the first terminal executes the voice service, and the location information of the first terminal.

By means of the communication method and the terminal disclosed in the present invention, it is implemented that when a terminal executes a voice service, interference caused by a nearby device that is playing audio by using a loudspeaker is avoided.

DETAILED DESCRIPTION

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

A communication method provided in embodiments of the present invention may be applied to a scenario below. When a terminal starts to execute a voice service, for example, the voice service may be a voice call and a video call, or may be a voice short message (for example, a WeChat), a voice command, and the like. A nearby device (for example, a smart television, a portable computer, a player, or a computer) that is playing audio by using a loudspeaker may interfere with a user of the terminal. Here, the audio includes an audio file or an audio stream, or may include an audio file in a video file or an audio stream in a video stream. In addition, the foregoing loudspeaker may be a loudspeaker that is built in the terminal, or may be a loudspeaker that is connected to the terminal in a wired or wireless manner.

Embodiment 1

Figure 1:
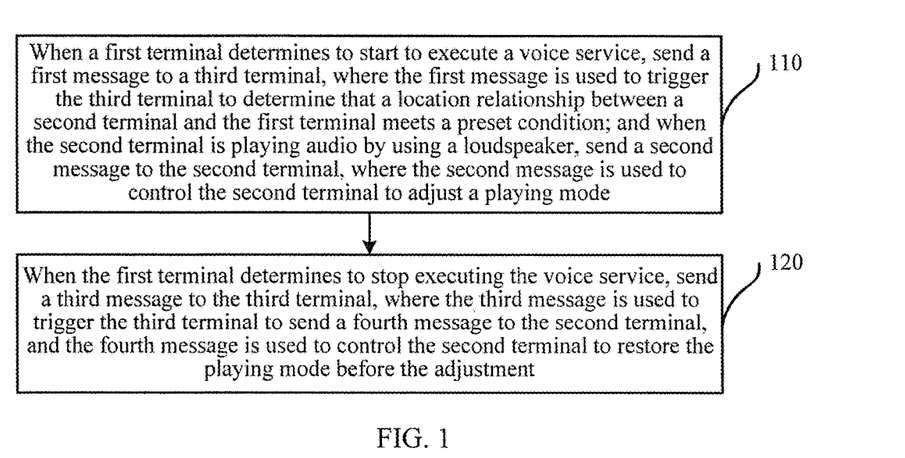
FIG. 1 is a flowchart of a communication method according to Embodiment 1 of the present invention.

FIG. 1 is a flowchart of a communication method according to Embodiment 1 of the present invention. The method is applied to a first terminal. The first terminal maintains a communication connection with a third terminal. The third terminal further maintains a communication connection with at least one second terminal. As shown in FIG. 1, this embodiment of the present invention specifically includes the following steps:

Step 110: When the first terminal determines to start to execute a voice service, send a first message to the third terminal, where the first message is used to trigger the third terminal to determine that a location relationship between the second terminal and the first terminal meets a preset condition; and when the second terminal is playing audio by using a loudspeaker, send a second message to the second terminal, where the second message is used to trigger the second terminal to adjust a playing mode.

Optionally, the adjusting a playing mode includes: pausing playing of the audio, turning off the loudspeaker, or turning down output volume of the loudspeaker.

Specifically, when the first terminal detects that the first terminal starts to execute the voice service, the first terminal sends the first message to the third terminal, where the first message includes an identifier of the first terminal and an identifier indicating that the first terminal executes the voice service. Optionally, the first message may include an identifier of the first terminal, an identifier indicating that the first terminal executes the voice service, and location information of the first terminal. The location information of the first terminal may be obtained by the first terminal by using some auxiliary technologies (for example, a positioning technology).

Optionally, before step 110, further includes: receiving, by the third terminal, verification information that is sent by the first terminal and that carries the identifier of the first terminal, and verifying, by the third terminal according to the verification information, the first terminal that corresponds to the identifier of the first terminal. It should be noted that the third terminal in this embodiment of the present invention may separately establish a communication connection with the first terminal and at least one second terminal. Optionally, the third terminal may establish a local area network with the first terminal and the at least one second terminal. The first terminal and the at least one the second terminal may also communicate with each other. The third terminal may control, by transmitting a message, an instruction or signaling, at least one of the first terminal and the at least one second terminal to perform a corresponding operation.

After the third terminal receives the first message sent by the first terminal, the third terminal determines whether a location relationship between the at least one second terminal and the first terminal meets a preset condition, and whether the at least one second terminal is playing audio by using a loudspeaker. The determining whether a location relationship between the at least one second terminal and the first terminal meets a preset condition includes: determining whether a distance value between the first terminal and the second terminal is not greater than a first preset threshold, where the first preset value may be set in advance, may be adjusted by a user according to a requirement, or may be adaptively adjusted by the third terminal according to some information (for example, a feedback of a user, or an update of software version data). The location information of the first terminal and the location information of the second terminal may be directly acquired by using an indoor positioning technology. For example, specific indoor locations of the first terminal and the second terminal are acquired by using Bluetooth, WiFi or another communications technology, so as to determine whether the distance value between the first terminal and the second terminal is not greater than the preset threshold. Alternatively, the location information of the first terminal and the location information of the second terminal are acquired by using another auxiliary technology (for example, an indoor map), so as to determine whether the location relationship between the second terminal and the first terminal meets the preset condition. Several types of auxiliary technologies that can acquire the location information of the first terminal are briefly described as follows:

(1) A distance parameter of the first terminal away from Kinect may be determined by using a Kinect technology, so as to acquire the location information of the first terminal.

(2) A smart floor technology is used, that is, a sensor or another device is laid under the floor to acquire, in a manner of weight determining, optical determining or the like, a specific location where the first terminal is located, and further to determine the distance value between the first terminal and the second terminal.

3) An M2M sensor is used, that is, several sensors are arranged indoors and may sense an area where the first terminal is currently located and an area where the second terminal is currently located, so as to determine the distance value between the first terminal and the second terminal. In addition, there are still many other auxiliary technologies for acquiring the location information of the first terminal and the second terminal, which is not listed and described herein in detail.

Optionally, the first terminal periodically acquires location information, and sends the acquired location information to the third terminal. For example, when a location of the first terminal is updated, the location information, of the first terminal, obtained by using the positioning technology changes. Therefore, the first terminal periodically acquires the location information of the first terminal, and sends the acquired location information to the third terminal.

It should be noted that the sending, by the first terminal, the acquired location information to the third terminal includes: directly sending, by the first terminal, the location information acquired by the first terminal to the third terminal. Alternatively, when a distance value between a first location indicated in the currently acquired location information and a second location indicated in the location information sent to the third terminal exceeds a second preset threshold, the first terminal sends the location information acquired by the first terminal to the third terminal. After the third terminal receives the location information that is sent by the first terminal and that carries the identifier of the first terminal, the location information of the first terminal that corresponds to the identifier of the first terminal is updated by using the foregoing location information.

The sending, by the first terminal, the acquired location information to the third terminal may further include: directly sending, by the first terminal, the location information acquired by the first terminal to the third terminal. After the third terminal receives the location information that is sent by the first terminal and that carries the identifier of the first terminal, the location information of the first terminal that corresponds to the identifier of the first terminal is updated by directly using the foregoing location information; or, when the distance value between the first location indicated in the currently received location information and the second location indicated in the received location information exceeds the second preset threshold, the location information of the first terminal that corresponds to the identifier of the first terminal is updated by using the foregoing location information.

Step 120: When the first terminal determines to stop executing the voice service, send a third message to the third terminal, where the third message is used to trigger the third terminal to send a fourth message to the second terminal, and the fourth message is used to trigger the second terminal to restore the playing mode before the adjustment.

Optionally, the restoring the playing mode before the adjustment includes: continuing playing the audio, turning on the loudspeaker, or restoring the output volume of the loudspeaker to a value before the adjustment.

For example, when determining to stop executing the voice service, the first terminal sends the third message to the third terminal. When receiving the third message sent by the first terminal, the third terminal sends the fourth message to the second terminal, where the fourth message is used to trigger the second terminal to restore to the playing mode before the adjustment. For example, the restoring, by the second terminal, the playing mode before the adjustment is executing one of the following operations: continuing playing the audio, turning on the loudspeaker, or restoring the output volume of the loudspeaker to a value before the adjustment.

Therefore, the communication method provided in this embodiment of the present invention implements that when a terminal executes a voice service, interference caused by a nearby device that is playing audio by using a loudspeaker is avoided, and such a manner of pausing playing of audio may enable a user to enjoy the audio in a continuous manner, so that interruption is avoided.

Embodiment 2

Figure 2:
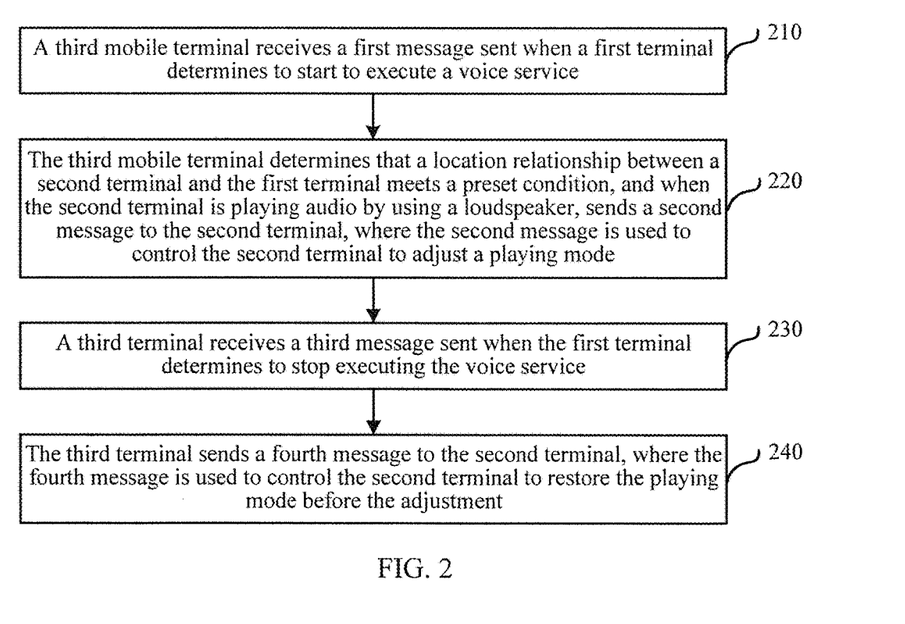
FIG. 2 is a flowchart of a communication method according to Embodiment 2 of the present invention.

FIG. 2 is a flowchart of a communication method according to Embodiment 2 of the present invention. The method is applied to a third terminal. The third terminal maintains a communication connection with at least one first terminal. The third terminal maintains a communication connection with at least one second terminal. As shown in FIG. 2, this embodiment of the present invention specifically includes the following steps:

Step 210: The third terminal receives a first message sent when the first terminal determines to start to execute a voice service.

Optionally, the foregoing first message includes an identifier of the first terminal and an identifier indicating that the first terminal executes the voice service; or, the foregoing first message includes an identifier of the first terminal, an identifier indicating that the first terminal executes the voice service, and location information of the first terminal. The location information of the first terminal may be obtained by the first terminal by using some auxiliary technologies (for example, a positioning technology). The process of acquiring the location information occurs before step 210 or after step 210, that is:

Before step 210 or after step 210, this embodiment of the present invention further includes: sending, by the first terminal, verification information that carries the identifier of the first terminal to the third terminal, and verifying by the third terminal according to the verification information, the first terminal that corresponds to the identifier of the first terminal. It should be noted that the third terminal in this embodiment of the present invention may separately establish a communication connection with the first terminal and at least one second terminal. Optionally, the third terminal may establish a local area network with the first terminal and the at least one second terminal. The first terminal and the at least one the second terminal may also communicate with each other. The third terminal may control, by transmitting a message, an instruction or signaling, at least one of the first terminal and the at least one second terminal to perform a corresponding operation.

Optionally, the third terminal receives the location information sent by the first terminal, and updates previously saved location information sent by the first terminal; and/or, the third terminal receives the location information sent by the second terminal, and updates previously saved location information sent by the second terminal. For example, the first terminal periodically acquires the location information of the first terminal, and sends the location information that carries the identifier of the first terminal to the third terminal, and the third terminal updates previously saved location information sent by the first terminal. Alternatively, the third terminal periodically acquires the location information of the first terminal, and updates, according to the acquired location information of the first terminal, previously saved location information sent by the first terminal. Alternatively, when a distance value between a first location indicated in the location information of the first terminal and a second location indicated in the location information, of the first terminal, sent to the third terminal exceeds a second preset threshold, the first terminal sends latest location information of the first terminal to the third terminal.

Step 220: The third terminal determines that a location relationship between the second terminal and the first terminal meets a preset condition, and when the second terminal is playing audio by using a loudspeaker, sends a second message to the second terminal, where the second message is used to trigger the second terminal to adjust a playing mode.

For example, the adjusting, by the second terminal, the playing mode is executing one of the following operations: pausing playing of the audio, turning off the loudspeaker, or turning down output volume of the loudspeaker.

Step 230: The third terminal receives a third message sent when the first terminal determines to stop executing the voice service.

Step 240: The third terminal sends a fourth message to the second terminal, where the fourth message is used to trigger the second terminal to restore the playing mode before the adjustment.

For example, the restoring, by the second terminal, the playing mode before the adjustment is executing one of the following operations: continuing playing the audio, turning on the loudspeaker, or restoring the output volume of the loudspeaker to a value before the adjustment.

Therefore, by means of the communication method provided in this embodiment of the present invention, it is implemented that when a terminal executes a voice service, interference caused by a nearby device that is playing audio by using a loudspeaker is avoided, and such a manner of pausing playing of audio may enable a user to enjoy the audio in a continuous manner, so that interruption is avoided.

Embodiment 3

Figure 3:
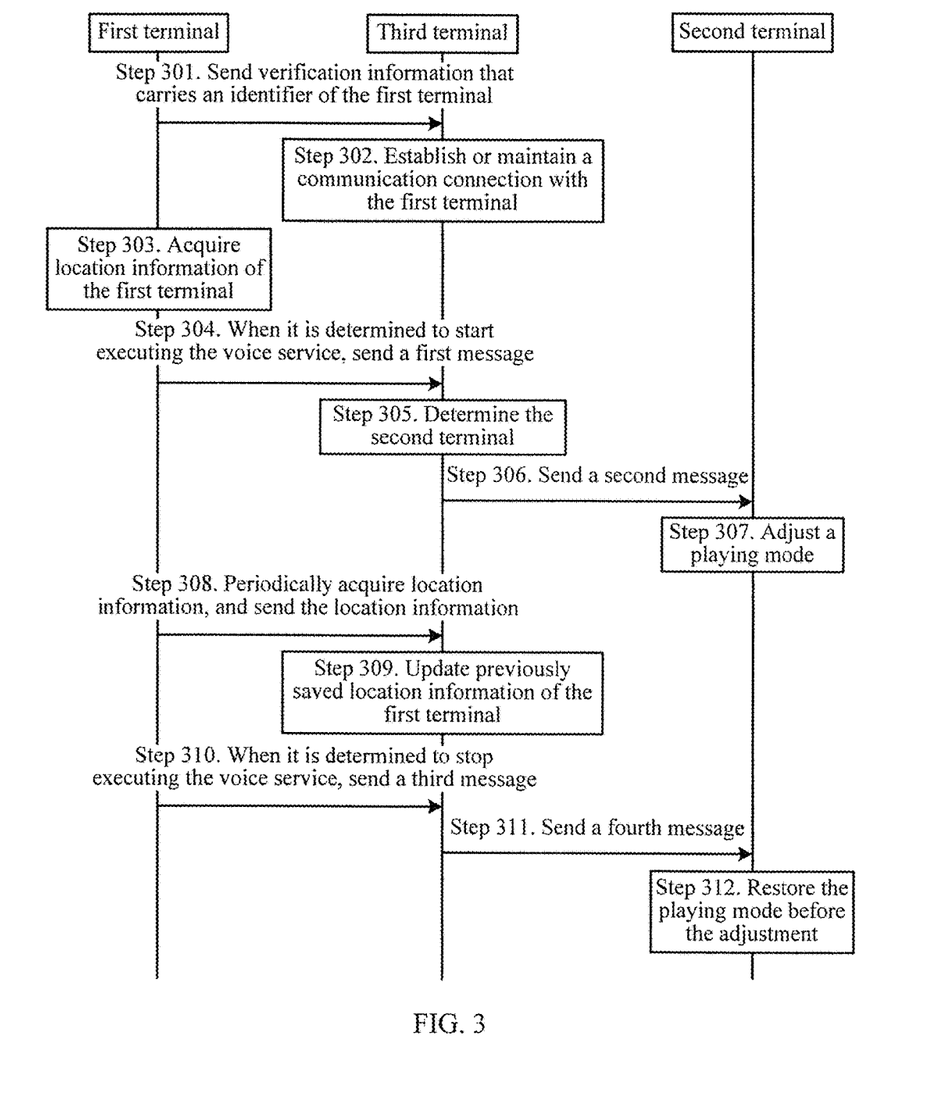
FIG. 3 is an information interaction diagram of a communication method according to Embodiment 3 of the present invention.

FIG. 3 is an information interaction diagram of a communication method according to Embodiment 3 of the present invention. As shown in the figure, this embodiment of the present invention specifically includes the following steps:

Step 301: A first terminal sends verification information that carries an identifier of the first terminal to a third terminal.

Optionally, step 301 may further be replaced with: A first terminal keeps detecting whether a user starts to execute a voice service, and when detecting that the user starts to execute the voice service, the first terminal sends verification information that carries an identifier of the first terminal to a third terminal. It should be noted that step 301 is an optional step.

Step 302: The third terminal establishes or maintains a communication connection with the first terminal that corresponds to the identifier of the first terminal, and the third terminal establishes or maintains a communication connection with at least one second terminal.

Step 303: The first terminal acquires location information of the first terminal by using several auxiliary technologies.

Step 304: When the first terminal determines to start to execute the voice service, send a first message to the third terminal, where the first message includes an identifier of the first terminal, an identifier indicating that the first terminal executes the voice service, and the location information of the first terminal.

Step 305: The third terminal determines, according to the received first message, that a location relationship between the second terminal and the first terminal meets a preset condition, and that the second terminal is playing audio by using a loudspeaker. The preset condition includes: whether a distance value between the first terminal and the second terminal is not greater than a first preset threshold, where the first preset value may be set in advance, may be adjusted by a user according to a requirement, or may be adaptively adjusted by the third terminal according to some information (for example, a feedback of a user, or an update of software version data).

Step 306: The third terminal sends a second message to the second terminal.

Step 307: The second terminal adjusts a playing mode according to the received second message.

Step 308: The first terminal periodically acquires location information, and sends the acquired location information to the third terminal.

Step 309: The third terminal updates, according to the currently received location information, previously saved location information sent by the first terminal.

Step 310: When the first terminal determines to stop executing the voice service, send a third message to the third terminal.

Step 311: The third terminal sends a fourth message to the second terminal according to the received third message.

Step 312: After the second terminal receives the fourth message, restore the playing mode before the adjustment.

Therefore, by means of the communication method provided in this embodiment of the present invention, it is implemented that when a terminal executes a voice service, interference caused by a nearby device that is playing audio by using a loudspeaker is avoided.

Embodiment 4

Figure 4:
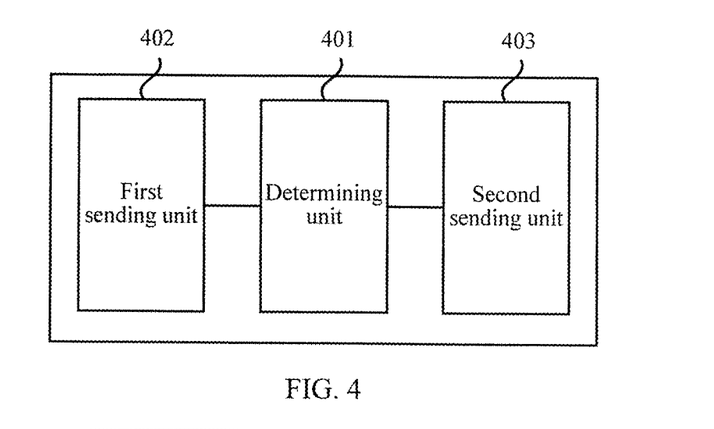
FIG. 4 is a schematic diagram of a terminal according to Embodiment 4 of the present invention.

FIG. 4 is a schematic diagram of a terminal according to Embodiment 4 of the present invention. The terminal is configured to execute the communication methods provided in Embodiment 1 and Embodiment 3 of the present invention. As shown in FIG. 4, the terminal maintains a communication connection with a third terminal, and the third terminal further maintains a communication connection with at least one second terminal. The terminal includes: a determining unit 401, a first sending unit 402, and a second sending unit 403.

The determining unit 401 is configured to determine whether the terminal executes a voice service.

The first sending unit 402 is configured to: when the determining unit 401 determines that the terminal starts to execute the voice service, send a first message to the third terminal, where the first message is used to trigger the third terminal to determine that a location relationship between the second terminal and the terminal meets a preset condition; and when the second terminal is playing audio by using a loudspeaker, send a second message to the second terminal, where the second message is used to trigger the second terminal to adjust a playing mode.

The second sending unit 403 is configured to: when the determining unit 401 determines that the terminal stops executing the voice service, send a third message to the third terminal, where the third message is used to trigger the third terminal to send a fourth message to the second terminal, and the fourth message is used to trigger the second terminal to restore the playing mode before the adjustment.

Optionally, the adjusting a playing mode includes: pausing playing of the audio, turning off the loudspeaker, or turning down output volume of the loudspeaker; and correspondingly, the restoring the playing mode before the adjustment includes: continuing playing the audio, turning on the loudspeaker, or restoring the output volume of the loudspeaker to a value before the adjustment.

Optionally, the terminal further includes:

an acquiring unit, configured to periodically acquire location information; and a third sending unit, configured to send the location information acquired by the acquiring unit to the third terminal.

Optionally, the first message sent by the first sending unit 402 includes an identifier of the terminal and an identifier indicating that the terminal executes the voice service. Alternatively, the first message sent by the first sending unit 402 includes an identifier of the terminal, an identifier indicating that the terminal executes the voice service, and the location information of the terminal.

Figure 5:
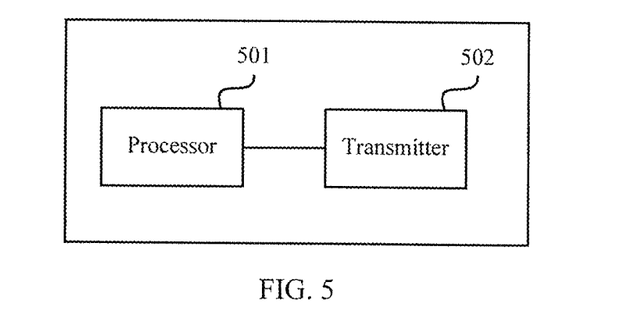
FIG. 5 is another schematic diagram of the terminal according to Embodiment 4 of the present invention.

In addition, for the terminal provided in this embodiment of the present invention, the following implementation manners may be further used to implement the communication methods in Embodiment 1 and Embodiment 3 of the present invention. As shown in FIG. 5, the terminal maintains a communication connection with a third terminal, and the third terminal further maintains a communication connection with at least one second terminal. The terminal includes: a processor 501 and a transmitter 502.

The processor 501 is configured to determine whether the terminal executes a voice service.

The transmitter 502 is configured to: when the processor 501 determines that the terminal starts to execute the voice service, send a first message to the third terminal, where the first message is used to trigger the third terminal to determine that a location relationship between the second terminal and the terminal meets a preset condition; and when the second terminal is playing audio by using a loudspeaker, send a second message to the second terminal, where the second message is used to trigger the second terminal to adjust a playing mode.

The transmitter 502 is further configured to: when the processor 501 determines that the terminal stops executing the voice service, send a third message to the third terminal, where the third message is used to trigger the third terminal to send a fourth message to the second terminal, and the fourth message is used to trigger the second terminal to restore the playing mode before the adjustment.

Optionally, the adjusting a playing mode includes: pausing playing of the audio, turning off the loudspeaker, or turning down output volume of the loudspeaker; and correspondingly, optionally, the restoring the playing mode before the adjustment includes: continuing playing the audio, turning on the loudspeaker, or restoring the output volume of the loudspeaker to a value before the adjustment.

Optionally, the first message sent by the transmitter 502 includes an identifier of the terminal and an identifier indicating that the terminal executes the voice service; or the first message sent by the transmitter 502 includes an identifier of the terminal, an identifier indicating that the terminal executes the voice service, and the location information of the terminal.

The processor 501 is further configured to periodically acquire the location information of the terminal.

The transmitter 502 is further configured to send the location information, of the terminal, acquired by the processor 501 to the third terminal.

The terminal provided in this embodiment of the present invention is equivalent to the first terminals in Embodiment 1 and Embodiment 3. For specific details executed by the terminal, reference is made to Embodiment 1 and Embodiment 3. Details are not described herein again.

Therefore, the terminal provided in this embodiment of the present invention implements that when a terminal executes a voice service, interference caused by a nearby device that is playing audio by using a loudspeaker is avoided.

Embodiment 5

Figure 6:
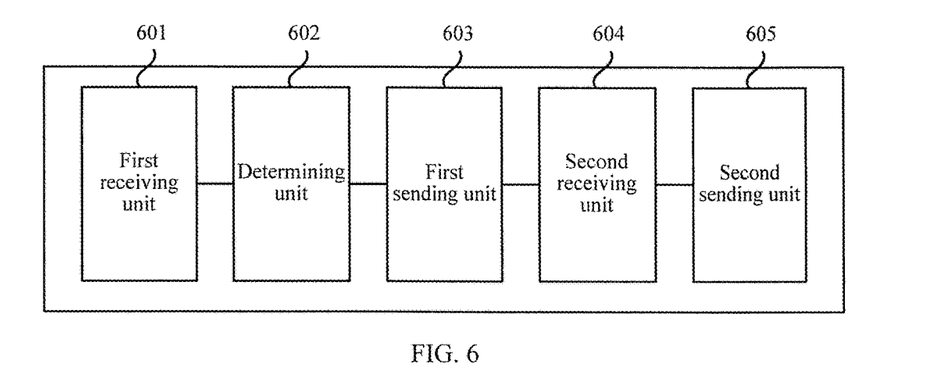
FIG. 6 is a schematic diagram of a terminal according to Embodiment 5 of the present invention.

FIG. 6 is a schematic diagram of a terminal according to Embodiment 5 of the present invention. The terminal is configured to execute the communication method provided in Embodiment 2 and Embodiment 3 of the present invention. As shown in FIG. 6, the terminal maintains a communication connection with at least one first terminal, and the terminal maintains a communication connection with at least one second terminal. The terminal includes: a first receiving unit 601, a determining unit 602, a first sending unit 603, a second receiving unit 604, and a second sending unit 605.

The first receiving unit 601 is configured to receive a first message sent when the first terminal determines to start to execute a voice service.

The determining unit 602 is configured to determine whether a location relationship between the second terminal and the first terminal meets a preset condition when or after the first receiving unit 601 receives the first message, and whether the second terminal is playing audio by using a loudspeaker.

The first sending unit 603 is configured to: when the determining unit 602 determines that the location relationship between the second terminal and the first terminal meets the preset condition, and that the second terminal is playing the audio by using the loudspeaker, send a second message to the second terminal, where the second message is used to trigger the second terminal to adjust a playing mode.

The second receiving unit 604 is configured to receive a third message sent when the first terminal determines to stop executing the voice service.

The second sending unit 605 is configured to send a fourth message to the second terminal, where the fourth message is used to trigger the second terminal to restore the playing mode before the adjustment.

Optionally, the adjusting a playing mode includes: pausing playing of the audio, turning off the loudspeaker, or turning down output volume of the loudspeaker.

Correspondingly, the restoring the playing mode before the adjustment includes: continuing playing the audio, turning on the loudspeaker, or restoring the output volume of the loudspeaker to a value before the adjustment.

Optionally, the terminal further includes one of the following: a first processing unit, configured to receive location information sent by the first terminal, and update previously saved location information sent by the first terminal; and a second processing unit, configured to receive location information sent by the second terminal, and update previously saved location information sent by the second terminal.

Optionally, the first message received by the first receiving unit 601 includes an identifier of the first terminal and an identifier indicating that the first terminal executes the voice service. Alternatively, the first message received by the first receiving unit 60 includes an identifier of the first terminal, an identifier indicating that the first terminal executes the voice service, and the location information of the first terminal.

Figure 7:
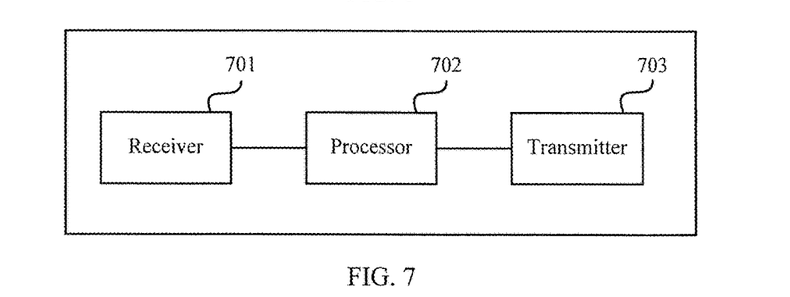
FIG. 7 is another schematic diagram of the terminal according to Embodiment 5 of the present invention.

In addition, for the terminal provided in this embodiment of the present invention, the following implementation manner may be further used to implement the communication methods in Embodiment 2 and Embodiment 3 of the present invention. As shown in FIG. 7, the terminal maintains a communication connection with at least one first terminal, and the terminal maintains a communication connection with at least one second terminal. The terminal includes: a receiver 701, a processor 702, and a transmitter 703.

The receiver 701 is configured to receive a first message sent when the first terminal determines to start to execute a voice service.

The processor 702 is configured to determine whether a location relationship between the second terminal and the first terminal meets a preset condition when or after the receiver 701 receives the first message, and whether the second terminal is playing audio by using a loudspeaker.

The transmitter 703 is configured to: when the processor 702 determines that the location relationship between the second terminal and the first terminal meets the preset condition, and the second terminal is playing the audio by using the loudspeaker, send a second message to the second terminal, where the second message is used to trigger the second terminal to adjust a playing mode.

The receiver 701 is further configured to receive a third message sent when the first terminal determines to stop executing the voice service.

The transmitter 703 is further configured to send a fourth message to the second terminal, where the fourth message is used to trigger the second terminal to restore the playing mode before the adjustment.

Optionally, the adjusting a playing mode includes: pausing playing of the audio, turning off the loudspeaker, or turning down output volume of the loudspeaker.

Correspondingly, the restoring the playing mode before the adjustment includes: continuing playing the audio, turning on the loudspeaker, or restoring the output volume of the loudspeaker to a value before the adjustment.

Optionally, the receiver 701 is further configured to receive the location information sent by the first terminal.

Optionally, the processor 702 is further configured to update, according to the location information that is sent by the first terminal and that is received by the receiver 701, previously saved location information sent by the first terminal.

Optionally, the receiver 701 is further configured to receive location information sent by the second terminal.

Optionally, the processor 702 is further configured to update, according to the location information that is sent by the second terminal and that is received by the receiver 701, previously saved location information sent by the second terminal.

Optionally, the first message received by the receiver 701 includes an identifier of the first terminal and the identifier indicating that the first terminal executes the voice service. Alternatively, the first message received by the receiver 701 includes an identifier of the first terminal, an identifier indicating that the first terminal executes the voice service, and the location information of the first terminal.

The terminal provided in this embodiment of the present invention is equivalent to the third terminals in Embodiment 2 and Embodiment 3. For specific details executed by the terminal, reference is made to Embodiment 2 and Embodiment 3. Details are not described herein again.

Therefore, the terminal provided in this embodiment of the present invention implements that when a terminal executes a voice service, interference caused by a nearby device that is playing audio by using a loudspeaker is avoided.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

Steps of methods or algorithms described in the embodiments disclosed in this specification may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

In the foregoing specific implementation manners, the objective, technical solutions, and benefits of the present invention are further described in detail. It should be understood that the foregoing descriptions are merely specific implementation manners of the present invention, but are not intended to limit the protection scope of the present invention. Any modification, equivalent replacement, or improvement made without departing from the spirit and principle of the present invention should fall within the protection scope of the present invention.

What is claimed is:

1. A communication method, applied to a first terminal, wherein the first terminal is configured to maintain a communication connection with a third terminal, and the third terminal is configured to maintain a communication connection with at least one second terminal, the method comprising:
periodically acquiring, by the first terminal using a positioning technology, location information of the first terminal;
when the first terminal determines to start to execute a voice service, sending a first message to the third terminal, wherein the first message comprises the location information of the first terminal and is used to trigger the third terminal to determine that a location relationship between the second terminal and the first terminal meets a preset condition based on the location information of the first terminal; and when the second terminal is playing audio by using a loudspeaker, sending a second message to the second terminal, wherein the second message is used to trigger the second terminal to adjust a playing mode; and when the first terminal determines to stop executing the voice service, sending a third message to the third terminal, wherein the third message is used to trigger the third terminal to send a fourth message to the second terminal, and the fourth message is used to trigger the second terminal to restore the playing mode before the adjustment.

2. The communication method according to claim 1, wherein:
adjusting a playing mode comprises:
pausing playing of the audio, turning off the loudspeaker, or turning down output volume of the loudspeaker; and
restoring the playing mode before the adjustment comprises:
continuing playing the audio, turning on the loudspeaker, or restoring the output volume of the loudspeaker to a value before the adjustment.

3. The communication method according to claim 1, further comprising:
acquiring, by the first terminal, the location information using the positioning technology, and sending the acquired location information to the third terminal when a location of the first terminal is updated and the acquired location information changes.

4. The communication method according to claim 1, wherein the first message further comprises an identifier of the first terminal.

5. The communication method according to claim 1, wherein the first message further comprises: an identifier indicating that the first terminal executes the voice service.

6. A communication method, applied to a third terminal, wherein the third terminal is configured to maintain a communication connection with at least one first terminal, and the third terminal is configured to maintain a communication connection with at least one second terminal, the method comprising:
receiving, by the third terminal, a first message sent when the first terminal determines to start to execute a voice service, wherein the first message comprises location information of the first terminal determined using a positioning technology;
determining, by the third terminal, that a location relationship between the second terminal and the first terminal meets a preset condition based on the location information of the first terminal, and when the second terminal is playing audio by using a loudspeaker, sending a second message to the second terminal, wherein the second message is used to trigger the second terminal to adjust a playing mode;
receiving, by the third terminal, a third message sent when the first terminal determines to stop executing the voice service; and
sending, by the third terminal, a fourth message to the second terminal, wherein the fourth message is used to trigger the second terminal to restore the playing mode before the adjustment.

7. The communication method according to claim 6, wherein:
adjusting a playing mode comprises:
pausing playing of the audio, turning off the loudspeaker, or turning down output volume of the loudspeaker; and
restoring the playing mode before the adjustment comprises:
continuing playing the audio, turning on the loudspeaker, or restoring the output volume of the loudspeaker to a value before the adjustment.

8. The communication method according to claim 6, further comprising:
updating previously saved location information sent by the first terminal.

9. The communication method according to claim 6, further comprising:
receiving, by the third terminal, location information sent by the second terminal, and updating previously saved location information sent by the second terminal.

10. The communication method according to claim 6, wherein the first message further comprises an identifier of the first terminal.

11. The communication method according to claim 6, wherein the first message further comprises an identifier indicating that the first terminal executes the voice service.

12. A first terminal configured to maintain a communication connection with a third terminal, and the third terminal is configured to maintain a communication connection with at least one second terminal, the first terminal comprising:
a processor, configured to:
periodically acquire, using a positioning technology, location information of the first terminal, and
determine whether the first terminal executes a voice service;
a transmitter, configured to:
when the processor determines that the first terminal starts to execute the voice service, send a first message to the third terminal, wherein the first message comprises the location information of the first terminal and is used to trigger the third terminal to determine that a location relationship between the second terminal and the first terminal meets a preset condition based on the location information of the first terminal; and when the second terminal is playing audio by using a loudspeaker, send a second message to the second terminal, wherein the second message is used to trigger the second terminal to adjust a playing mode, and
when the processor determines that the terminal stops executing the voice service, send a third message to the third terminal, wherein the third message is used to trigger the third terminal to send a fourth message to the second terminal, and the fourth message is used to trigger the second terminal to restore the playing mode before the adjustment.

13. The first terminal according to claim 12, wherein:
adjusting a playing mode comprises:
pausing playing of the audio, turning off the loudspeaker, or turning down output volume of the loudspeaker; and
restoring the playing mode before the adjustment comprises:
continuing playing the audio, turning on the loudspeaker, or restoring the output volume of the loudspeaker to a value before the adjustment.

14. The first terminal according to claim 12, wherein:
the processor is further configured to acquire the location information using the positioning technology and send the acquired location information to the third terminal when a location of the first terminal is updated and the acquired location information changes.

15. The first terminal according to claim 12, wherein the first message sent by the transmitter further comprises:

an identifier of the terminal; or an identifier indicating that the terminal executes the voice service.

16. A third terminal configured to maintain a communication connection with at least one first terminal and maintain a communication connection with at least one second terminal, the terminal comprising:

a receiver, configured to receive a first message sent when the first terminal determines to start to execute a voice service, wherein the first message comprises location information of the first terminal determined using a positioning technology;

a processor, configured to determine whether a location relationship between the second terminal and the first terminal meets a preset condition when or after the receiver receives the first message, based on the location information of the first terminal, and whether the second terminal is playing audio by using a loudspeaker;

a transmitter, configured to: when the processor determines that the location relationship between the second terminal and the first terminal meets the preset condition, and the second terminal is playing the audio by using the loudspeaker, send a second message to the second terminal, wherein the second message is used to trigger the second terminal to adjust a playing mode;

wherein the receiver is further configured to receive a third message sent when the first terminal determines to stop executing the voice service; and wherein the transmitter is further configured to send a fourth message to the second terminal, wherein the fourth message is used to trigger the second terminal to restore the playing mode before the adjustment.

17. The third terminal according to claim 16, wherein:

adjusting a playing mode comprises:

pausing playing of the audio, turning off the loudspeaker, or turning down output volume of the loudspeaker; and restoring the playing mode before the adjustment comprises:

continuing playing the audio, turning on the loudspeaker, or restoring the output volume of the loudspeaker to a value before the adjustment.

18. The third terminal according to claim 16, wherein:

the processor is further configured to update, according to the location information sent by the first terminal and received by the receiver, previously saved location information sent by the first terminal.

19. The third terminal according to claim 16, wherein:

the receiver is further configured to receive location information sent by the second terminal;

the processor is further configured to update, according to the location information sent by the second terminal and received by the receiver, previously saved location information sent by the second terminal.

20. The third terminal according to claim 16, wherein the first message received by the receiver further comprises:

an identifier of the first terminal; or an identifier indicating that the first terminal executes the voice service.

* * * * *